May 26, 1925.
H. S. MASONER
ARTIFICIAL FISH LURE
Filed March 8, 1921
1,539,365
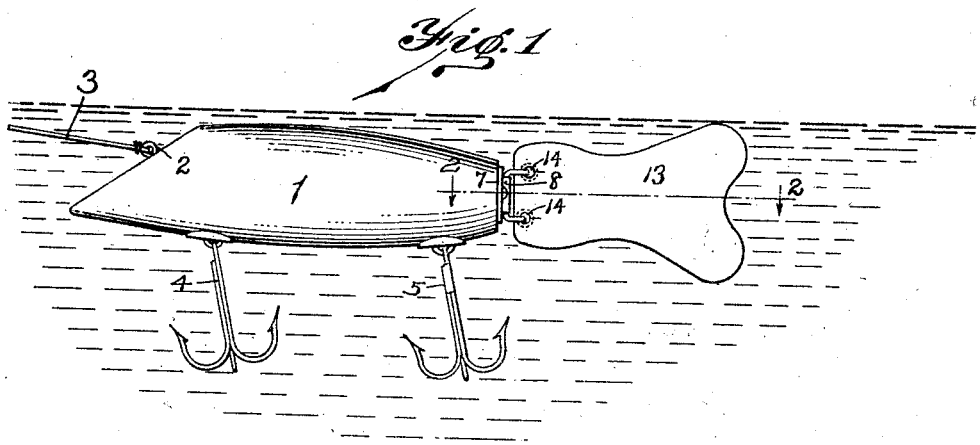
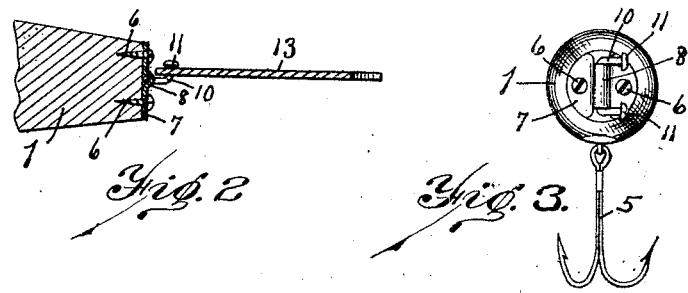
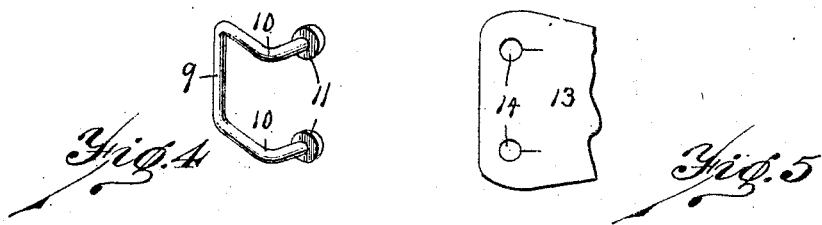
INVENTOR.
H. S. Masoner
BY Edward N. Pagelsen
ATTORNEY.

Patented May 26, 1925.

1,539,365

UNITED STATES PATENT OFFICE.

HAROLD S. MASONER, OF DETROIT, MICHIGAN.

ARTIFICIAL FISH LURE.

Application filed March 8, 1921. Serial No. 450,776.

*To all whom it may concern:*

Be it known that I, HAROLD S. MASONER, a citizen of the United States, and residing at Detroit, in the county of Wayne and State of Michigan, have invented a new and Improved Artificial Fish Lure, of which the following is a specification.

This invention relates to the construction of artificial fish baits or lures, and its object is to produce a lure which may have an attachable and detachable wiggly tail hinged to the body of the lure.

This invention consists of a body, a tail of flexible material unaffected by water, and means for hinging the tail to the rear end of the body and preferably, although not necessarily, in a vertical position.

It further consists in a hinge mounting provided with a pair of buttons or knobs, one above the other, and a strip of flexible material formed with holes through which the buttons may be thrust.

It also consists of the details of construction illustrated in the accompanying drawing and particularly pointed out in the claims.

In the drawing, Fig. 1 is a side elevation of my improved lure. Fig. 2 is a section on the line 2—2 of Fig. 1. Fig. 3 is a rear elevation of the lure. Fig. 4 is a perspective of one portion of the hinge for the flexible tail on a larger scale. Fig. 5 is a side elevation of the front end of the tail.

Similar reference characters refer to like parts throughout the several views.

The body of the lure is of any desired size, shape and color, preferably of wood so coated as to be water-proof. An eye 2 at the inclined front end of the body receives the line 3, and the hooks 4 and 5 attached to the body 1 may be of any desired character. Secured to the blunt rear end of the body by any desired means, screws 6 for example, is a plate 7 having a semi-circular rib 8 under which extends the vertical central pintle portion 9 of the tail support whose ends 10 are horizontal and preferably bent laterally and end in the buttons or knobs 11.

The thin flexible tail 13 is of rubber, pork-rind, leather, or other rather stiff but flexible material, substantially impervious to water, but preferably pork-rind, which is formed with eyelets 14 adapted to receive the buttons 11. These tails may therefore be kept moist in bottles when not in use and so they will not dry out but remain soft and pliable. When injured, a tail may be quickly removed and replaced with a new one. Because of the peculiar action of the water on this lure, this artificial tail wiggles in a natural manner while being drawn through the water.

The details, sizes and proportions of the several parts of this lure may all be changed by those skilled in the art without departing from the spirit of my invention as set forth in the following claims.

I claim:—

1. In an artificial fish lure, the combination of a body, a tail of rather stiff flexible material, and a hinge securing the tail in position, one of the members of said hinge embodying a pair of buttons and the tail having eyelets to receive the buttons.

2. In an artificial fish lure, the combination of a body having a blunt rear end, a thin metal plate attached to said rear end and having a vertical groove in its inner side, a pintle within the groove and having horizontal ends provided with buttons, and a flexible tail provided with eyelets to permit free attachment and detachment of the tail and pintle.

HAROLD S. MASONER.